United States Patent [19] [11] Patent Number: 4,550,267
Vaidya [45] Date of Patent: Oct. 29, 1985

[54] REDUNDANT MULTIPLE CHANNEL ELECTRIC MOTORS AND GENERATORS

[75] Inventor: Jayant G. Vaidya, Rockford, Ill.

[73] Assignee: Sundstrand Corporation, Rockford, Ill.

[21] Appl. No.: 744,887

[22] Filed: Jun. 14, 1985

Related U.S. Application Data

[63] Continuation of Ser. No. 467,685, Feb. 18, 1983, abandoned.

[51] Int. Cl.[4] .............................................. H02K 3/00
[52] U.S. Cl. .................................. 310/184; 310/112; 310/149
[58] Field of Search ................ 310/101, 112, 140–149, 310/254, 184, 131, 180, 184, 185, 188, 198, 205, 207, 208, 266; 307/84, 154, 155, 16, 46, 64, 67; 318/563–565

[56] References Cited

U.S. PATENT DOCUMENTS

| | | | |
|---|---|---|---|
| 1,936,415 | 11/1933 | Thompson | 307/16 |
| 1,958,650 | 5/1934 | Walton | 307/16 |
| 3,161,795 | 12/1964 | Bekey | 310/184 |
| 3,325,661 | 6/1967 | Parsons | 310/184 |
| 3,363,111 | 1/1968 | Moreines | 318/565 |
| 3,922,559 | 11/1975 | Migeon | 307/64 |
| 4,147,398 | 4/1979 | Lill | 310/184 |
| 4,168,459 | 9/1979 | Roesel, Jr. | 310/112 |
| 4,296,344 | 10/1981 | Rabe | 310/184 |

FOREIGN PATENT DOCUMENTS 2178790 11/1973 France .............................. 310/184

Primary Examiner—Peter S. Wong
Assistant Examiner—D. L. Rebsch
Attorney, Agent, or Firm—Harold A. Williamson; Ted E. Killingsworth; James A. Wanner

[57] ABSTRACT

An electromotive machine has a stator provided with multiple sets of windings, each independently, electrically coupled to an electrical means, to establish separate power channels between the windings and the electrical means that allow for the simultaneous independent transmission of power through the channels when the machine is in operation. The electromotive machine may take either the form of a motor or a generator.

38 Claims, 15 Drawing Figures

REDUNDANT MULTIPLE CHANNEL ELECTRIC MOTORS AND GENERATORS

This is a continuation of co-pending application Ser. No. 467,685 filed on 2-18-83, now abandoned.

TECHNICAL FIELD

This invention relates to a multi-channel electromotive machine of the type having a stator and a rotor.

BACKGROUND ART

Electric motors employed in environments that demand a fail safe source of motive power to be available even when there are present such faults in the motor windings as open circuit, short circuit and ground, have heretofore been unknown. The term fail safe as employed here is defined as being present when there are multiple redundant sources of motive power that are automatically present when one of the sources of motive power is lost for any reason.

Multiple redundant electromotive power sources in the form of multiple electric motors connected to drive a load in such a manner that the failure of one motor would leave a remaining motor or motors to drive the load have long been known.

In certain environments where space and weight considerations dictate the use of a single motor, multiple redundant electromotive power sources are simply prohibited. In this type of situation highly expensive finely crafted electric motors have been called into use in the hope of providing a sufficiently durable motor that was proven to have a high mean time between failures. Even with the most expensive motors, there is always the possibility of a fault arising in respect of one of the motor windings with the attendant loss of motive power. The invention to be described hereinafter by means of a novel multiple stator winding construction in conjunction with multiple power input channels provides a simple stator/rotor arrangement that creates a multiply redundant source of electromotive power.

There exists a number of commercial, aerospace and military environments where it is highly desirable to have multiple power channels electrically isolated, one from the other, which power channels are coupled to the same or separate loads. In the past, the simplest manner to accomplish this end would be to utilize a number of separate generators, each delivering power over a separate power channel to the same or separate loads.

In the situation where power is delivered to the same load over separate power channels from separate generators, there is inherently present the security of a redundant power supply to compensate for the possible occurrence of a fault arising in a winding of one of the generators with the attendant loss of power from the generator with the faulty winding. Where separate loads are powered by a single generator, the concern most generally has been that the characteristics of the load powered by the generator will be reflected electrically back into the generator which may affect the output to another load in a manner that is not acceptable. In the past, the solution to this problem of the load characteristics being reflected electrically back into the generator has been answered by utilizing separate generators connected to separate loads, or the addition of complex circuitry to ensure the isolation of one load from another where a common generator was employed.

The invention to be described hereinafter provides for a stator winding arrangement in a generator that allows multi-power channel operation with electrical and magnetic isolation between channels.

DISCLOSURE OF THE INVENTION

More specifically, this invention relates to an electromotive machine of the type having a stator and a rotor. The stator is provided with multiple sets of windings each independently electrically coupled to an electrical means to thereby establish separate power channels between the windings and the electrical means that allow for the simultaneous independent transmission of power through the channels when the machine is in operation. The electromotive machine may take either the form of a motor or a generator.

It is therefore one of the primary objects of the invention to provide multiple motive power redundancy in an electric motor by means of a stator winding arrangement that cooperates with a rotor structure to establish electromagnetic torque summing.

Of equal significance as an object of the invention is the provision of a redundant multiple power channel generator that has electrically isolated outputs to the same or different loads by utilizing a stator winding arrangement of the same configuration as that which is employed to provide multiple motive power redundancy in a motor.

Yet another object of the invention is the provision of a redundant multiple motive power electric motor wherein the rotor may be either of the permanent magnet type or the squirrel cage type.

Yet another object of the invention is to provide an electromotive machine with a stator that has a number of individual windings, which number of windings matches a desired number of motive power sources or power channel outputs sought.

Still yet another object of the invention is to provide an electromotive machine with a stator winding arrangement such that the stator is characterized by definitive multi-dimensional regions with each of the regions including a separate set of windings, to establish electrical and magnetic isolation between sets of windings.

Yet another object of the invention is to provide an electromotive machine with a stator winding arrangement such that the stator is characterized by definitive overlapping of multi-dimensional regions with a set of windings in each adjacent region overlapping a set of windings in an adjacent region.

In the attainment of the foregoing objects, the invention contemplates that the electromotive machine may be either a motor or a generator.

One embodiment of the invention takes the form of a DC brushless machine with a permanent magnet rotor, while another embodiment of the invention takes the form of an induction motor having a squirrel cage type rotor construction.

The electromotive machine embodying the invention may also take the form of a generator having a rotor driven by a source of motive power.

In all of the embodiments of the invention, the stator structure takes on the physical characteristics to be enumerated hereinafter.

The stator is provided with multiple sets of windings, each independently electrically coupled to an electrical means, which electrical means in the case of a DC brushless machine can be an inverter that provides multi-phase power input to the multiple sets of windings. The inverter in turn receives energy from a source of DC power. The invention contemplates that certain embodiments will call for two, three, four or more sets of stator windings depending upon the degree of redundancy desired.

The stator in all embodiments of the invention has multi-dimensional regions wherein there are located the sets of windings. In one embodiment of the invention, however, the definitive multi-dimensional regions are mutually exclusive and each of the regions has a separate set of windings.

Another embodiment of the invention makes a provision for the multi-dimensional regions to overlap one another with each region having a set of windings that overlap an adjacent set of windings in an overlapping region.

The invention, when utilized in an electromotive machine of the generator type, would of course, require that the rotor of the generator be adapted to be driven by a source of motive power.

The stator configuration employed in the generator environment takes on the same basic variety of configurations noted in respect of motor operation. The principle distinctions arising from the manner in which a load or loads are coupled to the power channels, the number of which channels are established by the number of sets of windings in the stator.

In a generator environment it should be readily appreciated that where there are multiple sets of stator windings all of which are individually connected to the same load, the presence of an electrical failure of any one of the sets of windings will still not interrupt power to the load in that the remaining redundant power channels will provide the needed power to the load.

In those situations where the multiple sets of windings are coupled individually or in groups to separate loads, there will inherently be established redundant power channels to the various loads while simultaneously assuring that the electrical characteristics of one of the loads will not affect the power in the channels delivered to another load.

Other objects and advantages of the present invention will be apparent upon reference to the accompanying description when taken in conjunction with the following drawings:

BEST MODE FOR CARRYING OUT THE INVENTION

There are certain applications in which it is desirable to have an electric motor with several channels of input power which are completely isolated, one from another. The motor arrangement now to be described provide such isolation in a manner such that it is possible to operate some of the channels while there are failures in one or more of the channels not in use. The motor now to be described provides multiple power channels for an electric motor which are isolated one from another, both electrically and magnetically.

Figure 1:
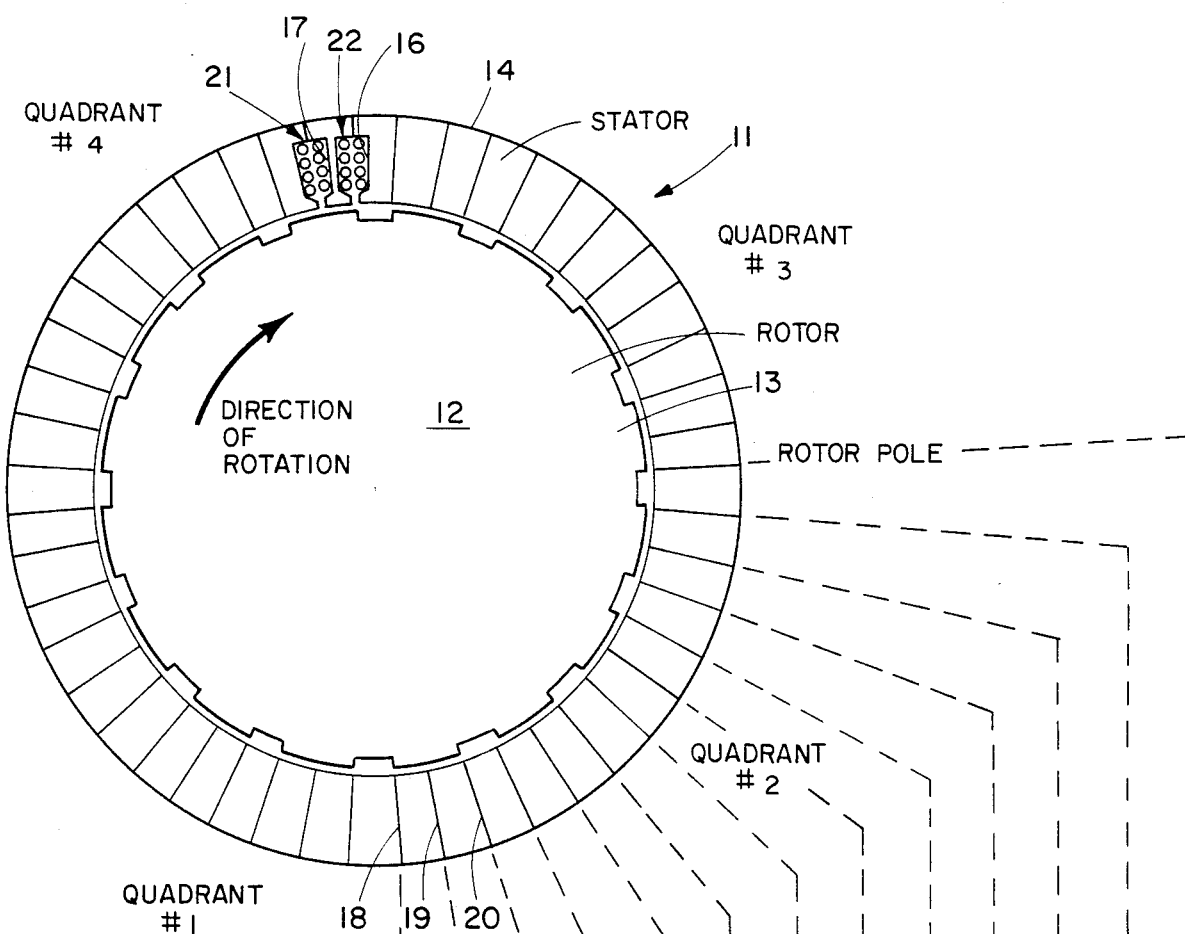
FIG. 1 is a cross-sectional showing of a motor embodying the invention.
Figure 2:
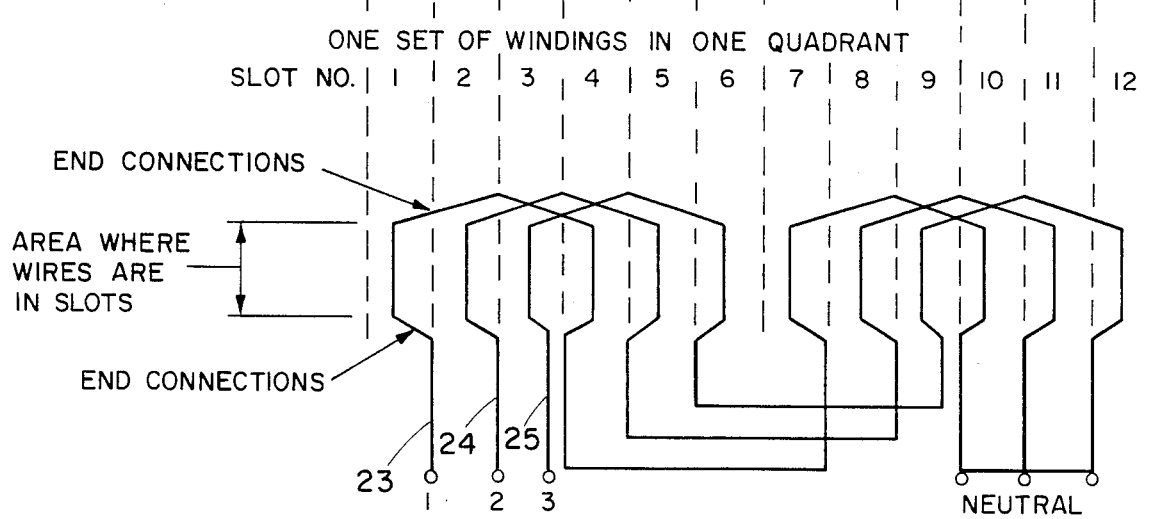
FIG. 2 is a schematic illustration of the manner in which an independent set of windings is wound on the stator of FIG. 1 in the second quadrant of the stator.

Reference is now made to FIG. 1 which is a cross-sectional showing of a motor 11 embodying the invention. The motor 11 as shown in this view includes a rotor 12 of the permanent magnet type. In this illustration the rotor has a sixteen pole permanent magnet field. One of the rotor poles 13 is indicated in the drawings. The fifteen remaining poles have no reference numerals assigned therewith, but can be plainly seen in FIG. 1. The motor 11 has a stator 14 which is schematically shown in this figure, and contains conventional stator slots such as 16 and 17. Into these slots are positioned windings such as those generally indicated by reference numerals 21, 27. It is to be understood that while FIG. 1 shows only stator slots, such as 16 and 17, there are such slots positioned completely around the stator 14. In this embodiment of the invention, for purposes of discussion only, and by way of example, the stator 14 has been divided into what is termed quadrants #1, #2, #3 and #4 as indicated in FIG. 1. In each quadrant there is provided an independent set of windings wound within the rotor slots not shown. In order to appreciate how these sets of windings are wound into the stator slots in each of the respective quadrants, attention is now directed to FIG. 2 which should be studied in conjunction with FIG. 1. For purposes of explanation, attention is initially directed to FIG. 1, where for purposes of describing the invention these are designated as stator slot lines 18, 19 and 20. These stator slot lines are drawn with each of the stator slots not shown, and are intended to provide an indication of the boundaries of slots which have been identified in FIG. 2 as being positioned between the slot lines. For example, in viewing FIG. 2 in conjunction with FIG. 1, it will be noted that slot number 1 is positioned between slot lines 18 and 19 of the stator 14. In FIG. 2 electrical leads 23, 24 and 25 are depicted as possessing respectively terminals 1, 2 and 3, and are wound in the fashion shown schematically in FIG. 2. When FIGS. 1 and 2 are viewed together, it will be appreciated that each of the remaining quadrants #1, #3 and #4 are intended to possess individual sets of windings wound in the manner such as that shown with respect to quadrant #2.

Figure 2A:
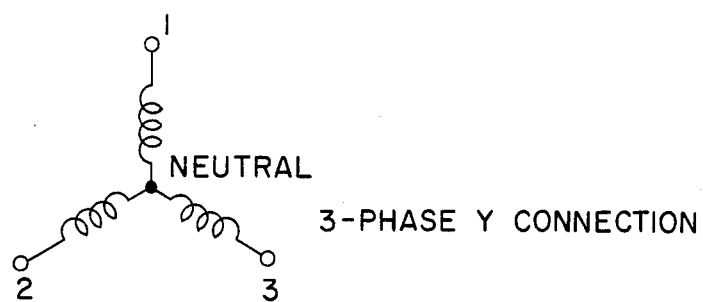
FIG. 2a is a symbolic illustration of the WYE winding arrangement shown in detail in FIG. 2.

FIG. 2a illustrates the conventional three-phase Y connection, a schematic representation of that which has been shown in expanded detail in FIG. 2. Although not shown in the drawings, it is to be understood that a three-phase delta winding arrangement may be substituted for the three-phase Y connection arrangement of FIG. 2.

Figure 3:
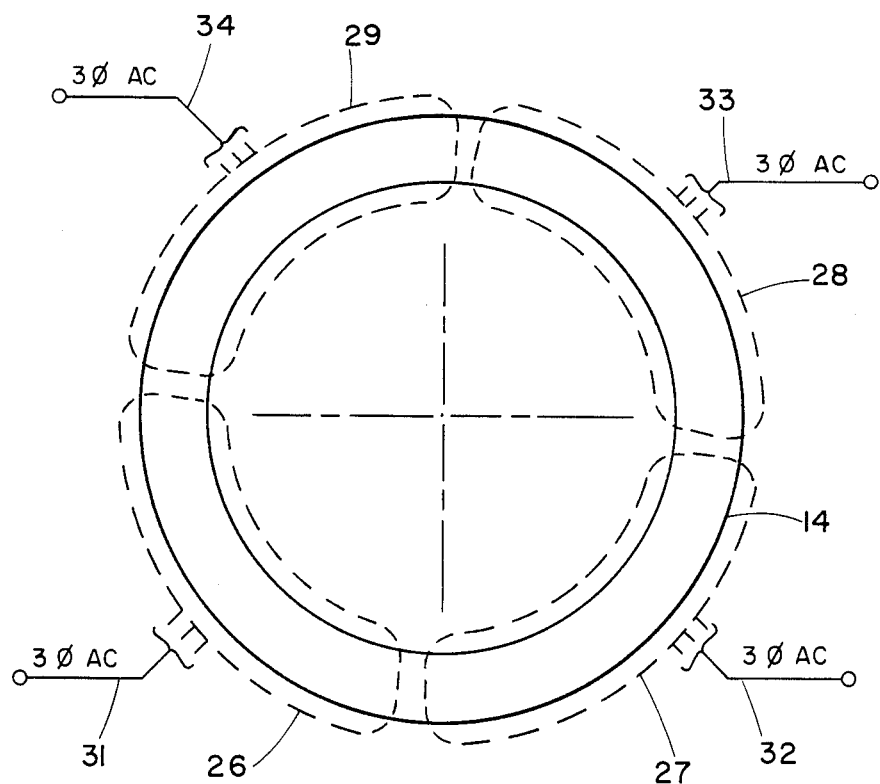
FIG. 3 depicts in schematic form the location of multiple sets of windings, totaling four in number, that are positioned such that each winding occupies a region that is mutually exclusive of a region occupied by another winding.
Figure 3A:
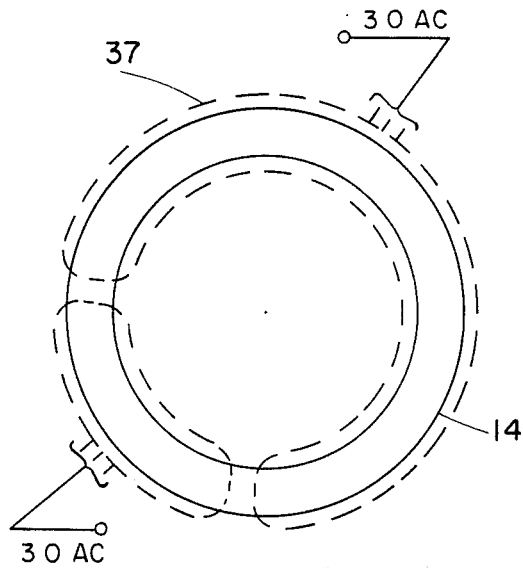
FIG. 3a and 3b illustrate a variation of a two winding arrangement where each winding occupies a region that is mutually exclusive of a region occupied by another winding.

It has been noted that each of the quadrants #1, #2, #3 and #4 are intended to include in one embodiment of the invention separate windings not shown in FIG. 1, but schematically represented in FIG. 3 by enclosed broken line sections 26, 27, 28 and 29 in FIG. 3. Each of these separate windings is provided with power over separate electrical leads 31, 32, 33 and 34. These separate electrical leads represent individual independent power input channels. During operation as a motor, each set of windings 26, 27, 28 and 29 together with the 4 poles on the rotor 12 facing the windings, form an independent channel with its own magnet field and with its respective windings unaffected by failures in any one or more of the windings in the other channels. As the rotor 12 rotates during the operation of the motor, the windings of the channel of the windings 26, 27, 28 and 29 will face different poles on the rotor 12. From the foregoing, it will be appreciated that even though the rotor moves and the rotor poles move consecutively through the fields created by the respective windings, the windings themselves remain isolated from each other, and therefore the power delivered respectively to each of the windings remains isolated from the power in the channels in the adjacent windings.

Reference is now made to FIGS. 3a through 3d, which illustrates schematically a number of stator winding configurations that the invention contemplates as being within the scope of the invention as set forth in the claims hereinafter. Accordingly, in FIG. 3a there will be observed that there are two sets of windings referenced 36 and 37. The winding 36 occupying a smaller portion of the total circumference of the stator. Winding 37 is wound around the balance of the stator in the manner shown.

Figure 3B:
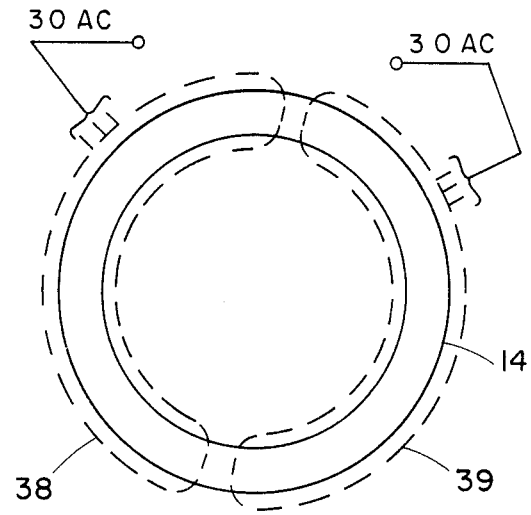

FIG. 3b illustrates a pair of windings 38 and 39, each of which occupies an equal circumferential area of the stator 14.

Figure 3C:
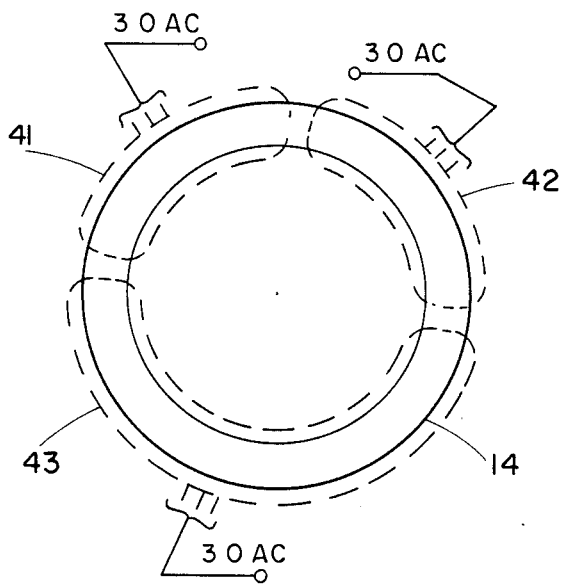
FIGS. 3c and 3d illustrate a variation of a three winding arrangement where each winding occupies a region that is mutually exclusive of a region occupied by another winding.
Figure 3D:
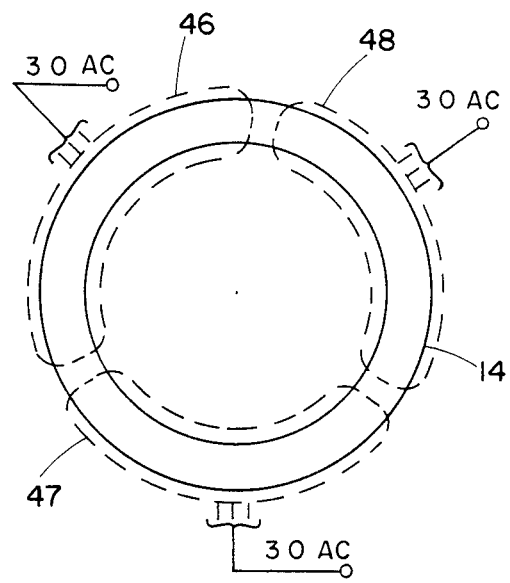

FIGS. 3c and 3d illustrate a variation in winding configurations and depict a pair of windings 41 and 42 of similar size with a third winding 43 occupying the balance of the circumferential area of the stator 14 not occupied by windings 41 and 42. In FIG. 3d there are also shown three sets of individual windings 46, 47 and 48. However, in this configuration each of the windings occupies one-third of the total circumferential area of the stator 14. It is to be understood that the winding arrangements of FIG. 3 and FIGS. 3a through 3d are intended to be but examples of the variations of stator winding locations contemplated by the invention, and that other arrangements and variations are intended to fall within the invention being described.

Figure 4:
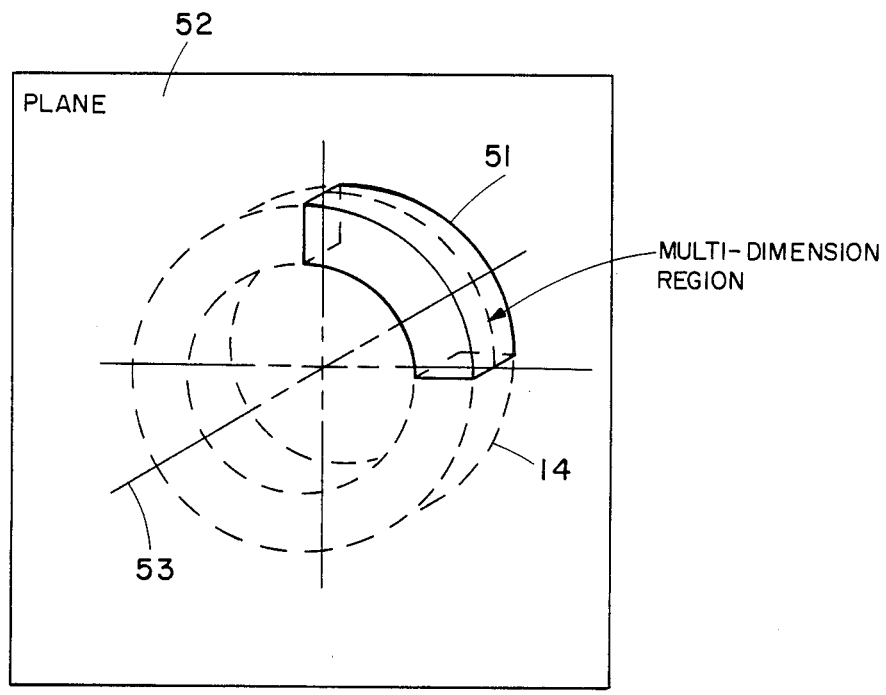
FIG. 4 is a three-dimensional illustration intended to convey the significance of the terms "definitive multi-dimensional region" which terms are employed in the description of the invention.

Reference is now made to FIG. 4 in which these is depicted a three-dimensional illustration intended to convey the significance of the terms "definitive multi-dimensional region", which terms are used hereinafter from time to time, to describe the location of individual windings mounted in a stator that embodies the invention. The multi-dimensional region indicated by reference numeral 51 and associated lead line is defined by a plane 52 shown passing at right angles through the stator 14 and an axis 53 coincident with the axis of rotation of the rotor not shown in FIG. 4.

Figure 5:
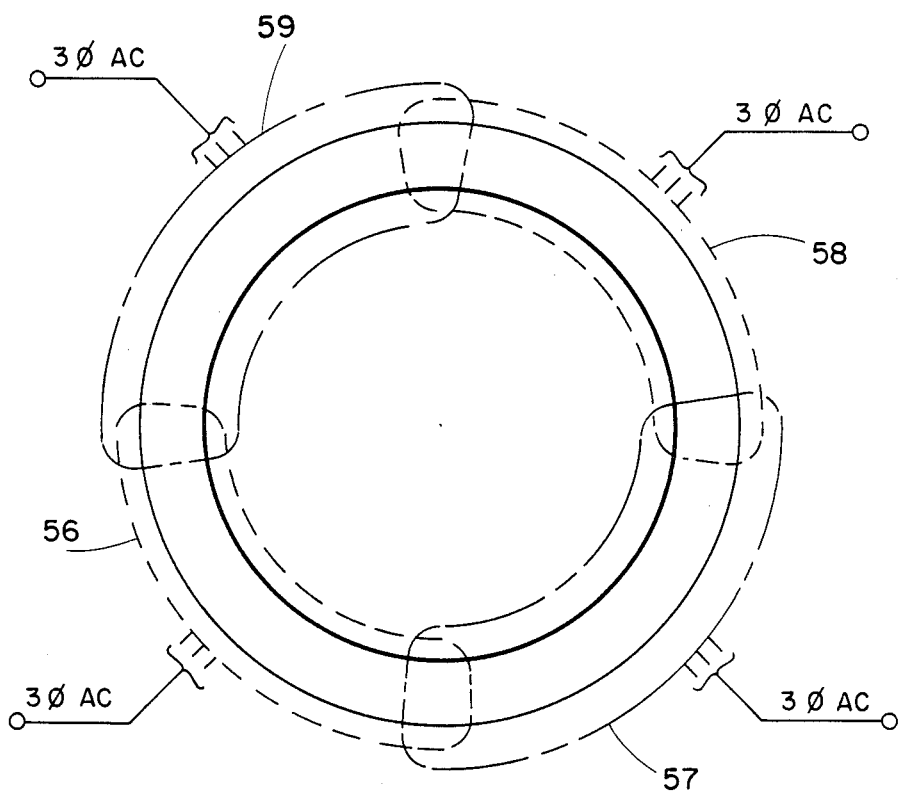
FIG. 5 depicts in schematic form another embodiment of the invention wherein the stator is shown having overlapping sets of windings in overlapping regions.

Reference is now made to FIG. 5 where there is shown schematically four sets of windings, 56, 57, 58 and 59. In each of the embodiments heretofore described, each of the individual windings were located within a speed multi-dimensional region, which regions did not overlap. It has been found however, that there are situations where electro-magnetic isolation may be compromised and the windings within regions are allowed to overlap. The invention contemplates that there will be instances where redundant power channels may include overlapping windings.

It should be apparent with respect to the motor described hereinbefore that the number of poles in the rotor is selected as any multiple of the channels required. For purposes of illustration, only with respect to FIGS. 1 and 2, four channels were selected and 16 poles on the rotor were selected. It should also be understood that the number of stator slots can similarly be any convenient multiple of the number of power channels.

Figure 6:
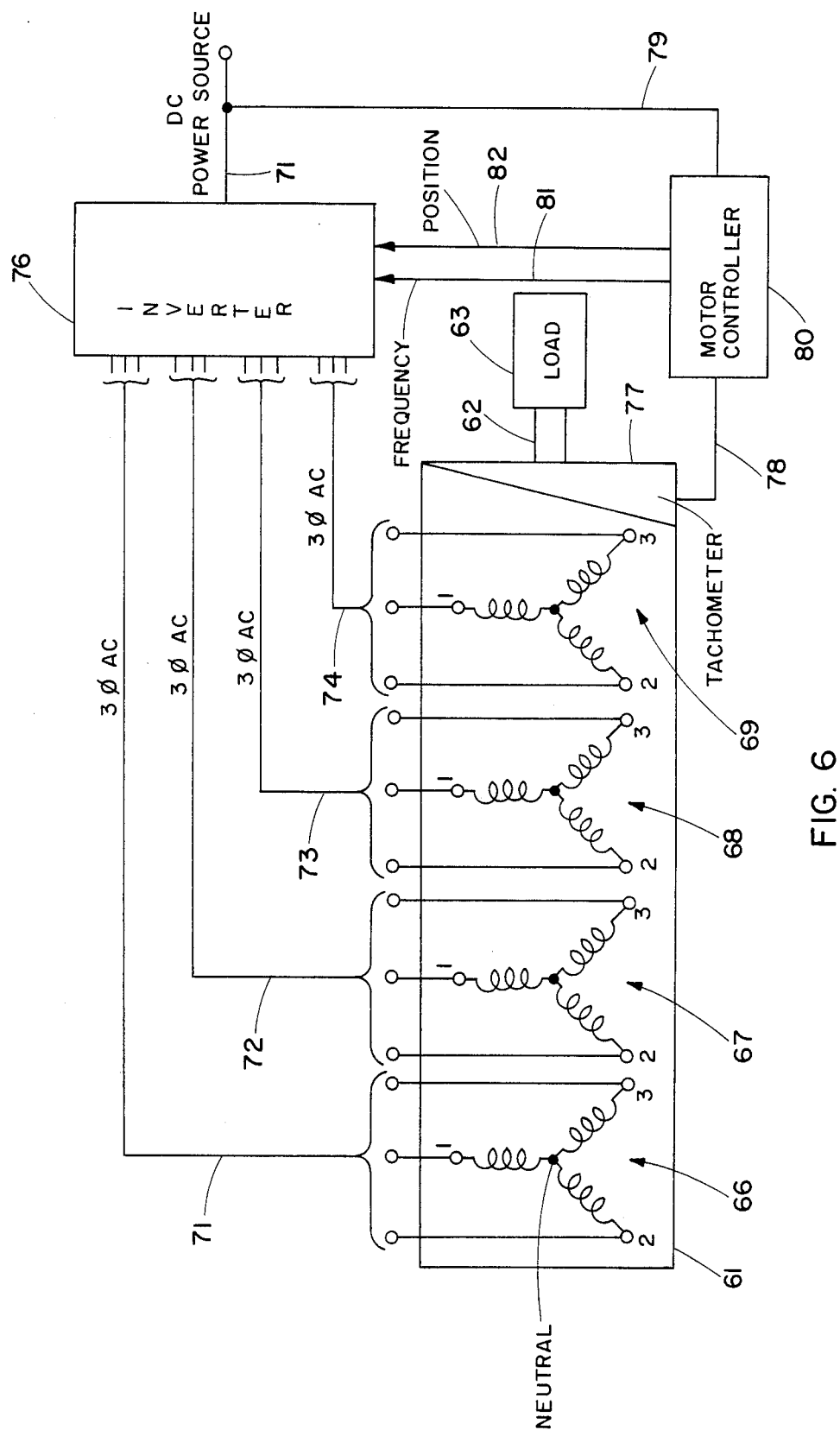
FIG. 6 is a schematic showing of the invention employed in a DC brushless motor controlled motor system.

Reference is now made to FIG. 6 which is a schematic showing of the invention employed in a DC brushless motor control system. The operation of the electric motor shown and described in respect of FIGS. 1 and 2 can be accomplished by applying a multi-phase power input to one or more of the four sets of windings from an inverter whose frequency is determined by the speed of the rotor and the number of field poles. In the arrangement to be described in more detail in respect of FIG. 6, if one or more sets of windings have failures, the motor can still be operated over the remaining power channels to winding sets that have no fault present. In FIG. 6, there is shown schematically a brushless DC motor 61 in which, for purposes of illustration and explanation only, four sets of windings 66, 67, 68 and 69 are shown. This arrangement is the same as that depicted in respect of the motor in FIG. 1 and 2. It is to be understood that any of the other winding arrangements of FIGS. 3a through 3d and FIG. 5 may be employed with the attendent change in power channels and degree of isolation that a particular winding set will inherently afford. The rotor is not shown in this schematic showing, however it is to be understood that the rotor though not shown, is drivingly connected to a motor shaft 62 which is in turn coupled to drive a load 63. Each of the windings 66, 67, 68 and 69 is independently electrically coupled to an electrical means in the form of an inverter 76, by way of electrical leads 71, 72, 73 and 74 respectively. These just noted electrical connections allow the establishment of separate power channels from the recited windings to and through the inverter 76 to a DC source of power via an electrical lead 71. The motor control shown in FIG. 6 will not be described in detail as it is conventional. It is believed sufficient to say that the brushless DC motor 61 includes a tachometer 77 connected to a motor controller 80 via lead 78, the motor controller 80 receiving power via lead 79 from the DC power source. The motor controller 80 delivers via leads 81 and 82 controlled signals in respect of frequency and position over these respective leads to control the inverter 76 in a wholly conventional fashion. It should be appreciated that in the arrangement shown in FIG. 6 should, for example, winding 66 have a fault and fail, then there would be provided redundant power channels from the inverter 76 via the remaining leads 72, 73 and 74.

Figure 7:
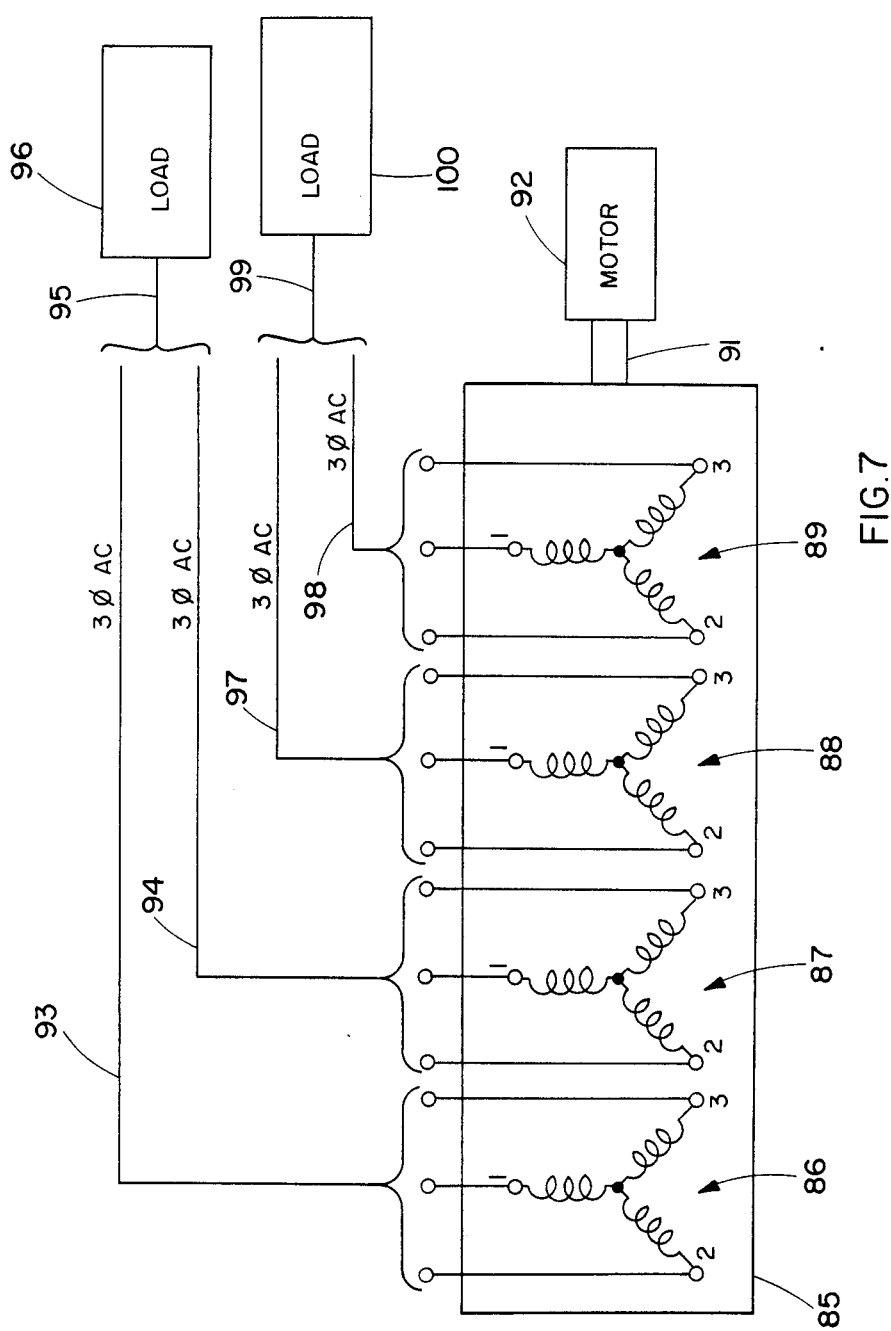
FIG. 7 is a schematic showing of an embodiment of the invention where the invention is employed as part of a power generating system to provide multiple power channels to multiple loads wherein each load has at least one redundant power channel available.

Reference is now made to FIG. 7 in which there is a schematic showing of an embodiment of the invention where the multiple stator winding arrangements described hereinbefore find utility in providing multiple power channels to multiple loads wherein each load has at least one redundant power channel available. As has been noted, there are certain applications where, because of space and weight considerations, a single generator structure must be called upon to provide an independent isolated supply of power over separate channels to individual loads. It is also desirable in some applications to be able to insure the redundant supply of power to a load in the event that one of the power channels to the load experiences a failure. Just such a system is illustrated in FIG. 7 where there can be seen shown schematically a generator 85 having by way of an example, stator windings 86, 87, 88 and 89. The generator 85 has a rotor, not shown, driven by a motive source of power here shown as a motor 92 via a shaft 91. It should be readily apparent that the arrangement shown schematically in FIG. 7 provides electrically isolated outputs via leads 93, 94, 97 and 98 to loads 96 and 100 via leads 95 and 99. The multiple set of windings 86, 87, 88 and 89 are electrically coupled, as noted above, to the loads and provide in the event of a stator winding failure or fault, redundant power channels from the remaining stator windings to the loads 96 and 100. In this environment it should be apparent that each of the loads 96 and 100 have a pair of redundant power channels represented by pairs of electrical leads 93, 94, as well as electrical lead pairs 97 and 98.

Figure 8:
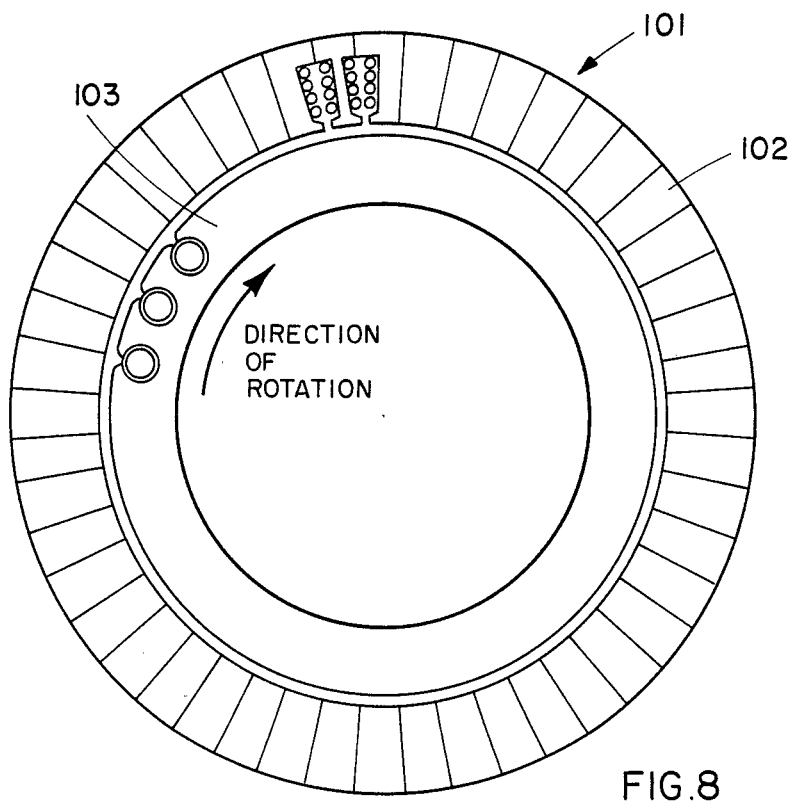
FIG. 8 is a cross-section showing of a squirrel cage induction motor in which the invention finds utility.
Figure 9:
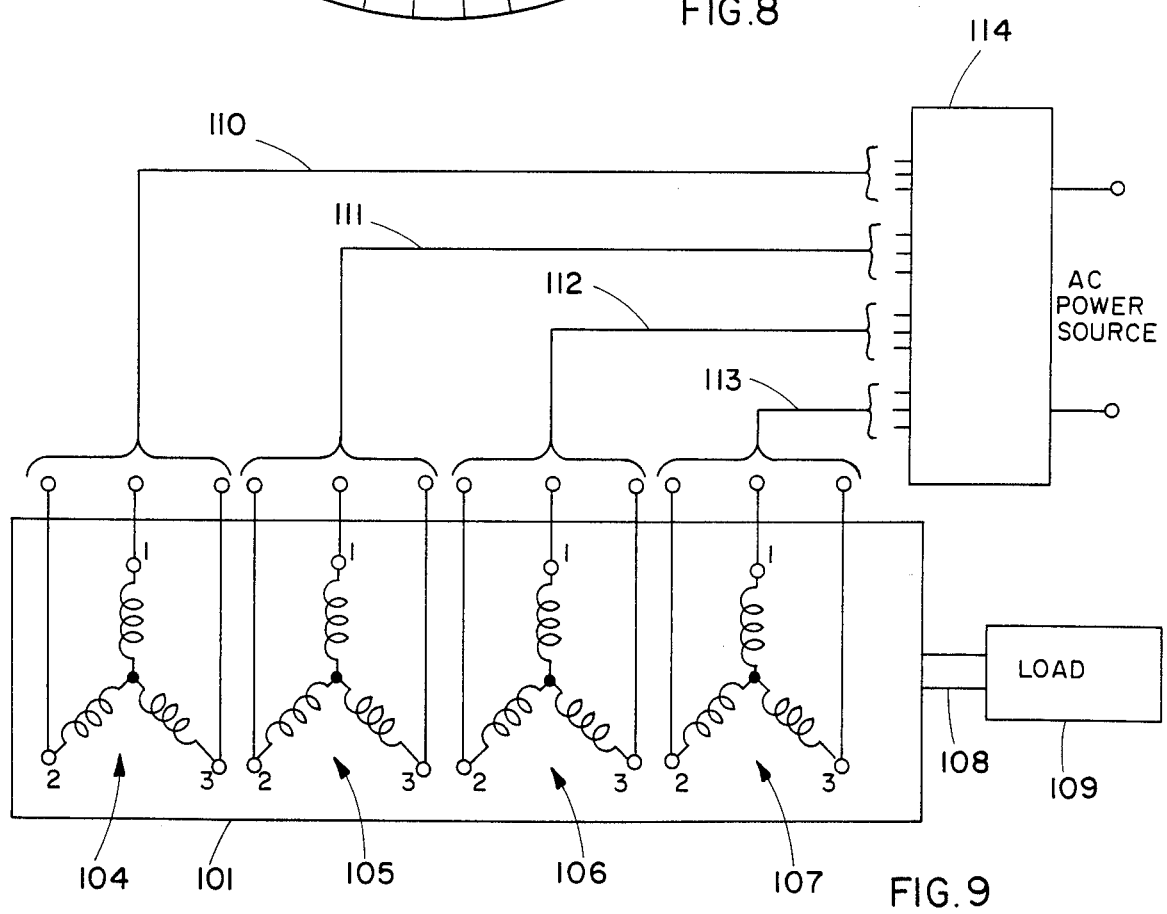
FIG. 9 is yet another embodiment of the invention wherein the generator incorporates the invention and provides multiple redundant power channels to a single load.

Attention is now directed to FIG. 8 in which figure there is shown in cross-section a squirrel cage induction motor that is provided with a conventional squirrel cage type rotor 103. The induction motor 101 has a stator 102 that possesses, for purposes of this description, the same four winding arrangements described with respect to FIGS. 1 and 2. This motor differs from the motor of FIGS. 1 and 2 in that there is provided, as noted above, a squirrel cage rotor 103 in place of a permanent magnet rotor. In FIG. 9 there is a squirrel cage induction motor shown driving a load 109 via a shaft 108. Multi-channel operation is accomplished by providing AC power through an electrical means 114 that conventionally divides the AC power received and delivers it to the respective power channels identified by the electrical leads 110, 111, 112 and 113 which are shown connecting the respective windings 104, 105, 106 and 107. The squirrel cage windings on the motor as shown schematically in FIG. 8 provide the induced magnetic field that produces mechanical torque for the purposes of providing rotation of the shaft 108 to the load 109. In the case of the induction motor with a squirrel cage motor, the number of poles on the rotor 103 is determined by the number of stator windings, and this can be selected as a multiple of the number of channels desired.

Figure 10:
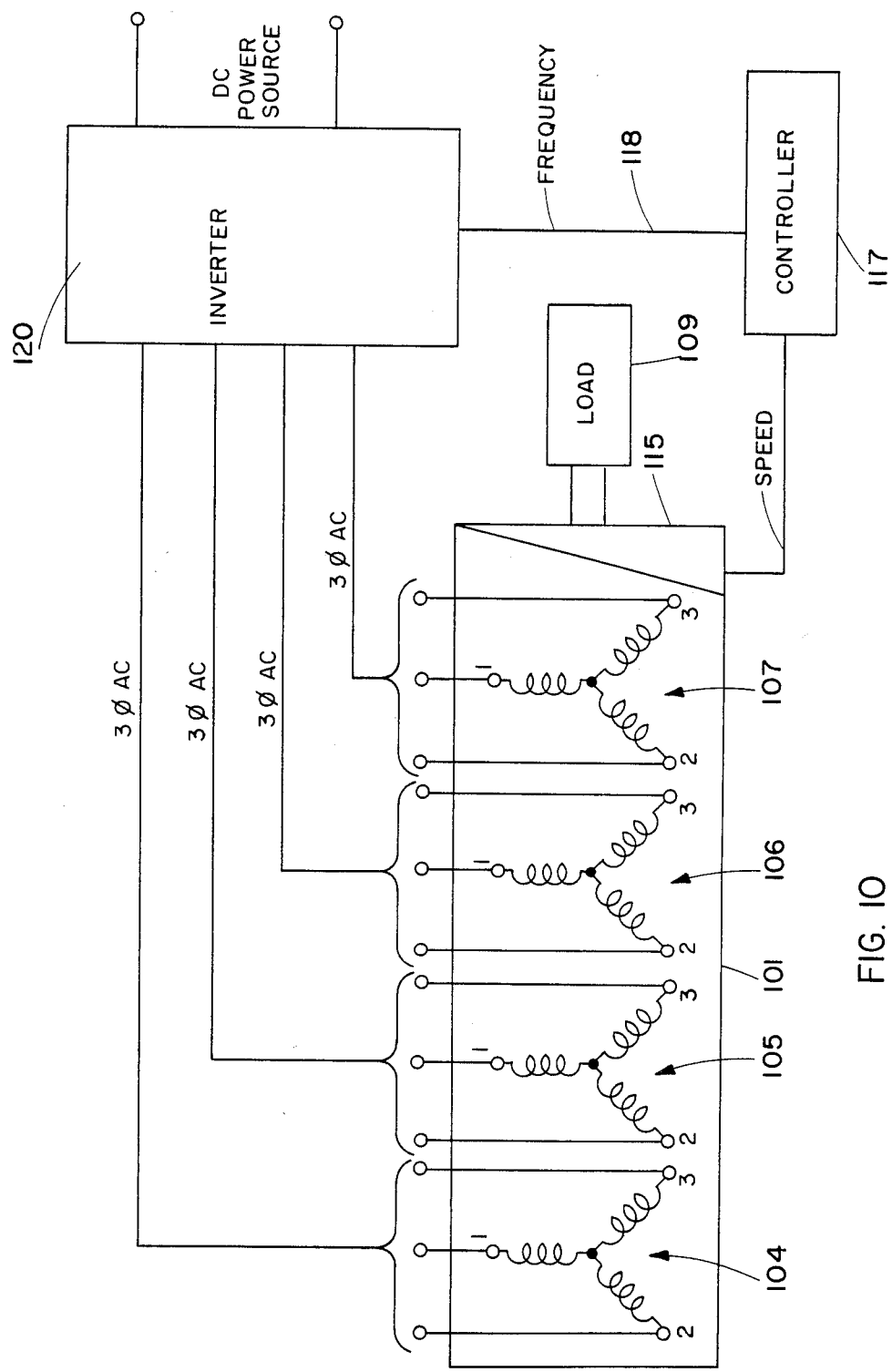
FIG. 10 is a schematic showing of another motor control system that would arise where a squirrel cage induction motor embodying the invention is present.

Reference is now made to FIG. 10, in which there is shown schematically another motor control system embodying the invention that arises where a squirrel cage induction motor embodying the invention is utilized. Little additional description is offered in respect of FIG. 10 other than to say that there is present, schematically shown, a squirrel cage motor 101 of the same type described in respect of FIG. 9. The addition of a tachometer 115, as well as a controller 117, and an electrical means 120 in the form of an inverter demonstrate another possible motor control arrangement that could utilize the multiple redundant power channel concept brought into existence by the use of multiple stator windings in the squirrel cage motor 101.

Heretofore, the operation of multiple channel motors, as well as generators, have been described. The following description is intended to describe the nature of faults in the windings and the effect of such faults in respect of isolation. There are basically three types of winding faults, namely, short circuit, open circuit and ground. During short circuit failure, one or more coils of the stator windings of the failed channel get shorted together. In the case of electrical motors and generators with permanent magnet fields described hereinbefore, such failure will result in a certain amount of power being generated and fed into the short circuited windings. This amount of power lost due to the short circuit will have to be provided by the remaining operating channel or channels in the case of an electric motor, or by the source of motive power, i.e. prime mover in the case of an electric generator. Other than this type of loss, there will be a minimal effect caused by the failed channels on the operating channels. In the case of an induction motor of the type shown in FIG. 8, the short circuit failure described above will not result in any power's being generated in the short circuit winding as long as it is isolated, because the squirrel cage rotor produces the magnet field only through induction from the stator windings. The presence of an open circuit fault in stator windings will render the failed channel useless for operation but will not affect the operation of other channels at all. The ground fault on the other hand will result in effects similar to the short circuit fault. It can be thus seen that the effect of failed channels is isolated and that they have minimal effect on the operation of other channels.

Although this invention has been illustrated and described in connection with the particular embodiment illustrated, it will be apparent to those skilled in the art that various changes may be made therein without departing from the spirit of the invention as set forth in the appended claims.

I claim:

1. An electromotive machine of the type having a stator and a rotor;
    said stator being provded with multiple sets of windings each independently electrically coupled to an electrical means with each set of windings simultaneously independently, transfering multiphase power between said electrical means and each set of windings to thereby establish separate power channels that allow for the simultaneous independent transmission of power through said channels when said machine is in operation.

2. The electromotive machine of claim 1 wherein said machine is a motor and said rotor is of the permanent magnet type.

3. The electromotive machine of claim 2 wherein said motor is a DC brushless machine and said multi-phase power input is provided by an inverter means from a source of DC power.

4. The electromotive machine of claim 3 wherein said multiple sets of windings comprise two sets of windings.

5. The electromotive machine of claim 3 wherein said multiple sets of windings comprise three sets of windings.

6. The electromotive machine of claim 3 wherein said multiple sets of windings comprise four sets of windings.

7. The electromotive machine of claim 1 wherein said stator has definitive multi-dimensional regions wherein there are located said sets of windings.

8. The electromotive machine of claim 7 wherein said definitive multi-dimensional regions are mutually exclusive and each of said regions has a separate set of windings.

9. The electromotive machine of claim 7 wherein said regions overlap one another and each said set of windings overlap an adjacent set of windings in an overlapping region.

10. The electromotive machine of claim 8 wherein said machine is a motor and said rotor is of the permanent magnet type.

11. The electromotive machine of claim 10 wherein said motor is a DC brushless machine and said multi-phase power input is provided by an inverter means from a source of DC power.

12. The electromotive machine of claim 9 wherein said machine is a motor and said rotor is of the permanent magnet type.

13. The electromotive machine of claim 12 wherein said motor is a DC brushless machine and said multi-phase power input is provided by an inverter means from a source of DC power.

14. The electromotive machine of claim 1 wherein said machine is an induction motor and said rotor is of the squirrel cage type.

15. The electromotive machine of claim 14 wherein said multiple sets of windings comprise three sets of windings.

16. The electromotive machine of claim 14 wherein said multiple sets of windings comprise four sets of windings.

17. The electromotive machine of claim 14 wherein said stator has definitive multi-dimensional regions wherein there are located said sets of windings.

18. The electromotive machine of claim 17 wherein said definitive multi-dimensional regions are mutually exclusive and each of said regions has a separate set of windings.

19. The electromotive machine of claim 17 wherein said regions overlap one another and each said set of windings overlap an adjacent set of windings in an overlapping region.

20. The electromotive machine of claim 19 wherein said electrical means that provides said multi-phase power input comprises an inverter means coupled to a source of DC power.

21. The electromotive machine of claim 1 wherein said machine is a generator, said rotor being coupled to a source of motive power and said electrical means is an electrical load means.

22. The electromotive machine of claim 21 wherein said electrical load means comprises multiple loads, each of which loads is individually coupled to at least one of said sets of windings.

23. The electromotive machine of claim 22 wherein said rotor is of the permanent magnet type.

24. The electromotive machine of claim 22 wherein said stator has definitive multi-dimensional regions wherein there are located said sets of windings.

25. The electromotive machine of claim 24 wherein said definitive multi-dimensional regions are mutually exclusive and each of said regions has a separate set of windings.

26. A permanent magnet brushless DC motor with multiple motive power redundancy accomplished by electromagnetic torque summing, said motor including in combination;

a stator and a permanent magnet rotor, said stator provided with multiple sets of windings each independently electrically coupled and simultaneously provided with a multi-phase source of electrical power to thereby establish separate power channels to said sets of windings to thereby provide continued motive power to be delivered from said rotor in the event that one of said sets of windings should experience failure.

27. The electromotive machine of claim 26 wherein said stator has definitive multi-dimensional regions wherein there are located said sets of windings.

28. The electromotive machine of claim 27 wherein said definitive multi-dimensional regions are mutually exclusive and each of said regions has a separate set of windings.

29. The electromotive machine of claim 26 wherein said regions overlap one another and each said set of windings overlap an adjacent set of windings in an overlapping region.

30. A squirrel cage induction motor with multiple motive power redundancy accomplished by electromagnetic torque summing said motor including in combination, a stator and a squirrel cage type rotor, said stator provided with multiple sets of windings each independently electrically coupled and simultaneously provided with a multi-phase source of electrical power to thereby establish separate power channels to said sets of windings to thereby provide continued motive power to be delivered from said rotor in the event that one of said sets of windings should experience an electrical failure.

31. The electromotive machine of claim 30 wherein said stator has definitive multi-dimensional regions wherein there are located said sets of windings.

32. The electromotive machine of claim 31 wherein said definitive multi-dimensional regions are mutually exclusive and each of said regions has a separate set of windings.

33. The electromotive machine of claim 30 wherein said regions overlap one another and each said set of windings overlap an adjacent set of windings in an overlapping region.

34. A multiple channel generator having electrically isolated outputs to multiple loads, said generator including in combination, a stator and a rotor adapted to be driven by a source of motive power, said stator being provided with multiple sets of windings, said multiple sets of windings adapted to be electrically coupled to said multiple loads to thereby simultaneously establish electrically isolated power channels to said multiple loads.

35. The electromotive machine of claim 34 wherein said stator has definitive multi-dimensional regions wherein there are located said sets of windings.

36. The electromotive machine of claim 35 wherein said definitive multi-dimensional regions are mutually exclusive and each of said regions has a separate set of windings.

37. The multiple channel generator of claim 36 wherein said rotor is of the permanent magnet type.

38. The multiple channel generator of claim 34 wherein said load means comprise multiple loads that are respectively electrically coupled to at least one power channel.

* * * * *

UNITED STATES PATENT AND TRADEMARK OFFICE
CERTIFICATE OF CORRECTION

PATENT NO. : 4,550,267
DATED : October 29, 1985
INVENTOR(S) : Jayant G. Vaidya

It is certified that error appears in the above-identified patent and that said Letters Patent are hereby corrected as shown below:

Col. 1, Line 1: Insert

--The invention described herein was made in the performance of work under NASA Contract No. NAS 9-16535 and is subject to the provisions of Section 305 of the National Aeronautics and Space Act of 1958 (72 Stat. 435; 42 U.S.C. 2457).--

Signed and Sealed this

Thirteenth Day of May 1986

[SEAL]

Attest:

DONALD J. QUIGG

Attesting Officer

Commissioner of Patents and Trademarks